(12) United States Patent
Awatsu (10) Patent No.: US 9,965,230 B2
(45) Date of Patent: May 8, 2018

(54) IMAGE PROCESSING SYSTEM, MOBILE TERMINAL, IMAGE PROCESSING APPARATUS, NON-TRANSITORY COMPUTER READABLE MEDIUM, AND IMAGE PROCESSING METHOD

(71) Applicant: FUJI XEROX CO., LTD., Tokyo (JP)

(72) Inventor: Yusaku Awatsu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days. days.

(21) Appl. No.: 15/045,760

(22) Filed: Feb. 17, 2016

(65) Prior Publication Data

US 2017/0060495 A1 Mar. 2, 2017

(30) Foreign Application Priority Data

Aug. 24, 2015 (JP) .................................. 2015-164595

(51) Int. Cl.
*G06K 15/00* (2006.01)
*G06F 3/12* (2006.01)
(Continued)

(52) U.S. Cl.
CPC .......... *G06F 3/1222* (2013.01); *G06F 3/0482* (2013.01); *G06F 3/1267* (2013.01);
(Continued)

(58) Field of Classification Search
CPC .... G06F 3/1222; G06F 3/0482; G06F 3/1253; G06F 3/1287; G06F 3/1288;
(Continued)

(56) References Cited

U.S. PATENT DOCUMENTS 6,522,421 B2 * 2/2003 Chapman .............. G06F 3/1207
358/1.15
8,844,059 B1 * 9/2014 Manmohan ........... G06F 21/554
726/26
(Continued)

FOREIGN PATENT DOCUMENTS

GB 2512140 A * 9/2014 ............. H04L 51/34
JP 2013-179472 A 9/2013

OTHER PUBLICATIONS

"Have to Use This! Method for Utilizing Screenshot Function of Smartphone" [Online], Mar. 29, 2014, [researched on Aug. 15, 2015], andronavi, Internet, <URL: http://andronavi.com/2014/03/320936/2>.

*Primary Examiner* — Neil R McLean
(74) *Attorney, Agent, or Firm* — Oliff PLC (57) ABSTRACT

An image processing system includes a mobile terminal and an image processing apparatus. The mobile terminal includes a display controller and a notification transmitting unit. The display controller obtains display data related to an electronic document from the image processing apparatus and performs control to display the obtained display data. If an unauthorized operation is performed when the display data is displayed, the notification transmitting unit transmits an unauthorized operation notification to the image processing apparatus. The image processing apparatus includes a memory, a providing unit, and a reporting unit. The memory stores an electronic document and a contact address in association with each other. The providing unit provides the mobile terminal with display data related to the electronic document. In response to receipt of the unauthorized operation notification, the reporting unit transmits a report to the contact address associated with the electronic document related to the display data.

6 Claims, 4 Drawing Sheets

(51) Int. Cl.
  *G06F 3/0482*  (2013.01)
  *H04N 1/00*  (2006.01)
  *G06F 21/60*  (2013.01)

(52) U.S. Cl.
  CPC .......... *G06F 3/1287* (2013.01); *G06F 3/1288* (2013.01); *G06F 21/608* (2013.01); *H04N 1/00042* (2013.01); *H04N 1/00079* (2013.01); *H04N 1/00244* (2013.01); *H04N 1/00307* (2013.01)

(58) Field of Classification Search
  CPC .............. G06F 3/1294; H04N 1/00042; H04N 1/00079; H04N 1/00244; H04N 1/00307
  See application file for complete search history.

(56) References Cited

U.S. PATENT DOCUMENTS

| | | | |
|---|---|---|---|
| 2012/0069371 A1* | 3/2012 | Fujii | ............... G06F 3/1208 358/1.13 |
| 2016/0253508 A1* | 9/2016 | Song | ............... G06F 21/44 |

* cited by examiner

| CORPORATION ID | FILE NAME | EMERGENCY CONTACT ADDRESS | RESERVATION NUMBER |
|---|---|---|---|
| AAA | SUGGESTION_FOR_XX_COMPANY.doc | Incident-sales@aaa.com | 12345678 |
| AAA | SUGGESTION_FOR_YY_COMPANY.doc | Incident-sales@aaa.com | 12345678 |
| AAA | SW_DEVELOPMENT_ROADMAP.doc | Incident-dev@aaa.com | 11111111 |
| XYZ | PROMOTION.pdf | alert@xyz.com | 99999999 |
| ... | ... | ... | ... |

FIG. 4

IMAGE PROCESSING SYSTEM, MOBILE
TERMINAL, IMAGE PROCESSING
APPARATUS, NON-TRANSITORY
COMPUTER READABLE MEDIUM, AND
IMAGE PROCESSING METHOD

CROSS-REFERENCE TO RELATED
APPLICATIONS

This application is based on and claims priority under 35 USC 119 from Japanese Patent Application No. 2015-164595 filed Aug. 24, 2015.

BACKGROUND (i) Technical Field

The present invention relates to an image processing system, a mobile terminal, an image processing apparatus, a non-transitory computer readable medium, and an image processing method.

(ii) Related Art

There are an increasing number of image processing apparatuses, such as multifunction peripherals (apparatuses having functions of a copier, a printer, a scanner, and so forth) that are available based on a charging system, installed in public places such as convenience stores. Also, a service called a "Net print service" is becoming popular. In this service, a user registers an electronic document to be printed in a server via the Internet, accesses the server from an image processing apparatus nearest to the user, downloads the registered electronic document to the image processing apparatus, and prints the electronic document.

With the recent proliferation of smartphones and radio communications, it has become possible to provide, from an image processing apparatus to a mobile terminal such as a smartphone carried by a user, a user interface (UI) screen for operating the image processing apparatus.

SUMMARY

According to an aspect of the invention, there is provided an image processing system including a mobile terminal and an image processing apparatus. The mobile terminal includes a display controller and a notification transmitting unit. The display controller obtains display data related to an electronic document from the image processing apparatus and performs control to display the obtained display data on a screen. If an unauthorized operation is performed when the display data is displayed on the screen under the control performed by the display controller, the notification transmitting unit transmits an unauthorized operation notification indicating that the unauthorized operation has been performed on the display data to the image processing apparatus. The image processing apparatus includes a memory, a providing unit, and a reporting unit. The memory stores an electronic document and a contact address in association with each other. The providing unit provides the mobile terminal with display data related to the electronic document. In response to receipt of the unauthorized operation notification regarding the display data from the mobile terminal, the reporting unit transmits a report indicating that the unauthorized operation has been performed to the contact address associated with the electronic document related to the display data.

BRIEF DESCRIPTION OF THE DRAWINGS

An exemplary embodiment of the present invention will be described in detail based on the following figures, wherein.

DETAILED DESCRIPTION

Figure 1:
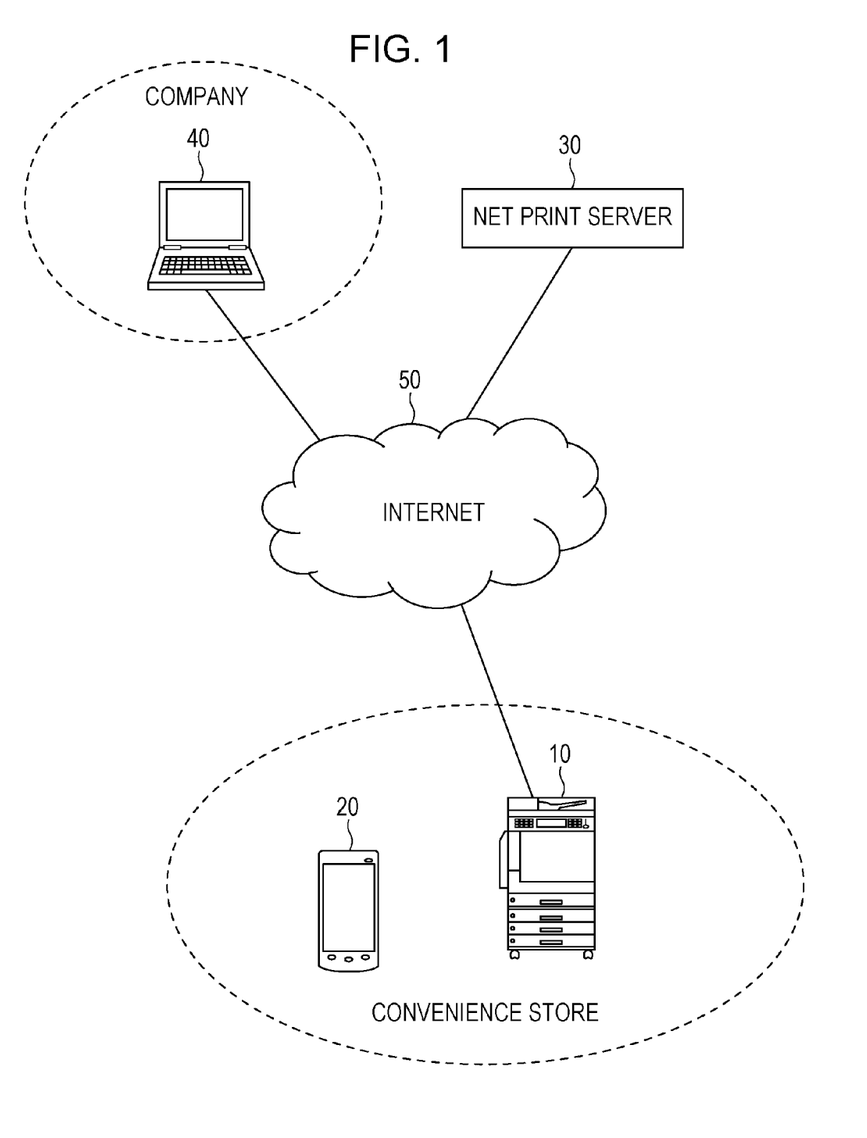
FIG. 1 is a diagram illustrating an example of a system to which a process according to the exemplary embodiment is applied.

FIG. 1 illustrates an example of a system to which a process according to an exemplary embodiment is applied. An image processing apparatus 10 installed in a public place, such as a convenience store, is connected to an Internet 50. The image processing apparatus 10 is an apparatus having a function of printing an electronic document input thereto, and is, for example, a multifunction peripheral. The image processing apparatus 10 is accompanied with, for example, a payment apparatus (not illustrated) that receives a charge for use of the image processing apparatus 10 from a user. The image processing apparatus 10 has a function of obtaining a list of electronic documents printable by the user from a Net print server 30 and displaying the list, and a function of downloading, from the Net print server 30, an electronic document that has been selected from the list by the user and is to be printed, and printing the downloaded electronic document.

The Net print server 30 provides a user with a Net print service. In the Net print service, registration of an electronic document to be printed is received from a user via the Internet 50, the registered electronic document is transferred to the image processing apparatus 10 compatible with the service, and the electronic document is printed out by the image processing apparatus 10. In a case where the Net print server 30 is configured not to request user registration, the Net print server 30 issues a unique reservation number when an electronic document to be printed is registered therein by a user, notifies the user of the reservation number, and stores the electronic document therein in association with the registration number. When the user inputs the reservation number to the image processing apparatus 10 compatible with the Net print service, the image processing apparatus 10 downloads the electronic document corresponding to the reservation number from the Net print server 30 and prints the electronic document. In a case where the Net print server 30 is configured to request user registration, the user logs in to the Net print server 30 after being authenticated and registers an electronic document. After that, the user selects the Net print server 30 from a menu displayed on the operation panel of the image processing apparatus 10, logs in after being authenticated, and thereby downloads the registered electronic document to the image processing apparatus 10 and prints the electronic document. In the method described below as an example, a reservation number is used, but the control according to the exemplary embodiment is not limited to the reservation number method. The exemplary embodiment is also applicable to a Net print service using a user registration method and other methods.

The details of a flow of the Net print service using the reservation number method are as follows.

In a case where a user has an electronic document whose printed result is likely to be necessary on the go, the user registers the electronic document in the Net print server 30. Specifically, the user accesses the Net print server 30 from a personal computer (PC) 40 in a company via the Internet 50. Subsequently, the user designates an electronic document to be printed, on a screen for document registration provided from the Net print server 30 (for example, a web page). As a target to be printed, plural electronic documents (files) may be designated. Accordingly, the electronic document is transmitted from the PC 40 to the Net print server 30. The Net print server 30 assigns a unique reservation number to the received electronic document, stores the electronic document in association with the reservation number, and transmits the reservation number to the PC 40 of the user (and/or transmits the reservation number to an email address input by the user). If plural electronic documents to be printed are designated on the screen for document registration, the plural electronic documents are registered in the Net print server 30 in association with one reservation number.

When the user needs a printed result of the electronic document or electronic documents on the go, the user goes to a nearby convenience store. The user calls the Net print service from a menu screen displayed on the operation panel of the image processing apparatus 10 compatible with the Net print server 30 and installed therein, and inputs the reservation number. The image processing apparatus 10 accesses the Net print server 30 and transmits the reservation number thereto. Then, the Net print server 30 provides the image processing apparatus 10 with a selection screen showing a list of file names or thumbnail images of representative pages of the electronic documents stored in association with the reservation number. Since there is a probability that the user is unable to identify a document from only the file name or thumbnail image thereof, more detailed preview images of several representative pages of the individual electronic documents (for example, the beginning of the documents) may be provided to the image processing apparatus 10 and the preview images may be displayed on the screen. On the selection screen, the user selects one or more electronic documents to be printed this time, and presses a print start button, which is a graphical user interface (GUI) component on the screen. Accordingly, the image processing apparatus 10 notifies the Net print server 30 of the selected electronic documents, and accordingly the Net print server 30 transmits the data of the selected electronic documents to the image processing apparatus 10. The image processing apparatus 10 prints out the electronic documents received thereby.

The Net print service may be used not only by a personal user but also by a corporate user. File names or thumbnail images, preview images of representative pages, and so forth of electronic documents registered in the Net print server 30 are displayed on the screen (operation panel) of the image processing apparatus 10. In the case of a corporate user, confidential information may leak from such display. As measures against information leakage from the screen of the Net print service, information such as file names or thumbnails may be transmitted from the image processing apparatus 10 to a mobile terminal 20 of a user and displayed thereon, instead of being displayed on the operation panel of the image processing apparatus 10. The mobile terminal 20 is, for example, a smartphone or tablet terminal. With the mobile terminal 20, it is easier to take measures against information leakage, for example, by changing the angle of its screen to make it difficult for other people to see the screen. For this purpose, an application program for using the image processing apparatus 10 (hereinafter referred to as a "print application") may be installed in the mobile terminal 20. The print application obtains information such as a list of file names or thumbnail images from the image processing apparatus 10 and displays the information, receives an instruction for the displayed list of file names (for example, selection of a document to be printed or designation of a print condition) from the user, and notifies the image processing apparatus 10 of the instruction from the user.

However, in a case where a corporate user uses the Net print server 30, there is some concern about information leakage from the mobile terminal 20 if a method of providing the mobile terminal 20 with information about electronic documents registered in the Net print server 30 and displaying the information on the mobile terminal 20 is used. In the case of corporate use, electronic documents registered in the Net print server 30 are used for company matters, and a list of file names or thumbnail images provided from the image processing apparatus 10 to the mobile terminal 20 may include information that is not to be leaked to the outside of the company. If such information is provided to the mobile terminal 20 and if the mobile terminal 20 is stolen or an employee carrying the mobile terminal 20 performs an unauthorized operation, there is a probability that the information will leak. Information leakage may be prevented by using a method in which the print application automatically deletes the information obtained from the image processing apparatus 10, such as a list of file names, when a session between the mobile terminal 20 and the image processing apparatus 10 is disconnected, but it is not possible to prevent information leakage during the session.

One of unauthorized operations that may result in information leakage during a session is snapshot capturing. This is an operation of capturing a snapshot of a screen displaying a list of file names or thumbnail images obtained from the image processing apparatus 10 and keeping the snapshot as an image file that is not automatically deleted at the end of the session. Regarding a snapshot, leakage of a snapshot image may be prevented by using an existing technique of automatically deleting the snapshot image. However, there is a demand for, if snapshot capturing that may result in information leakage occurs, recognizing the fact by the company side to take proactive measures against information leakage.

One of the methods for satisfying such a demand is a method in which, if the print application installed in the mobile terminal 20 detects that snapshot capturing has been performed, the print application transmits a notification indicating that snapshot capturing has been performed to the company that owns the target electronic document by email or by using a short message. However, it is relatively easy for a mail client or the like of the mobile terminal 20 to make a setting so that an email or a short message is unable to be transmitted to a specific address, such as an email address or phone number of the company. If such a setting is made by an employee carrying the mobile terminal 20, it is impossible to transmit information indicating snapshot capturing to the company.

Accordingly, in the exemplary embodiment, a notification indicating that snapshot capturing has been performed is transmitted from the mobile terminal 20 to the image processing apparatus 10 in a session between the mobile terminal 20 and the image processing apparatus 10, not by email or the like, and the notification is transferred from the image processing apparatus 10 to the company. To block the notification transmitted by the print application in a session between the mobile terminal 20 and the image processing apparatus 10, it is necessary to modify the print application, which is much more difficult than in the case of transmitting the notification by email or by using a short message. Further, to block the notification transmitted from the image processing apparatus 10 to the company, it is necessary to modify the image processing apparatus 10, which is very difficult. Hereinafter, a system for reporting an unauthorized operation via the image processing apparatus 10 will be described.

Figure 2:
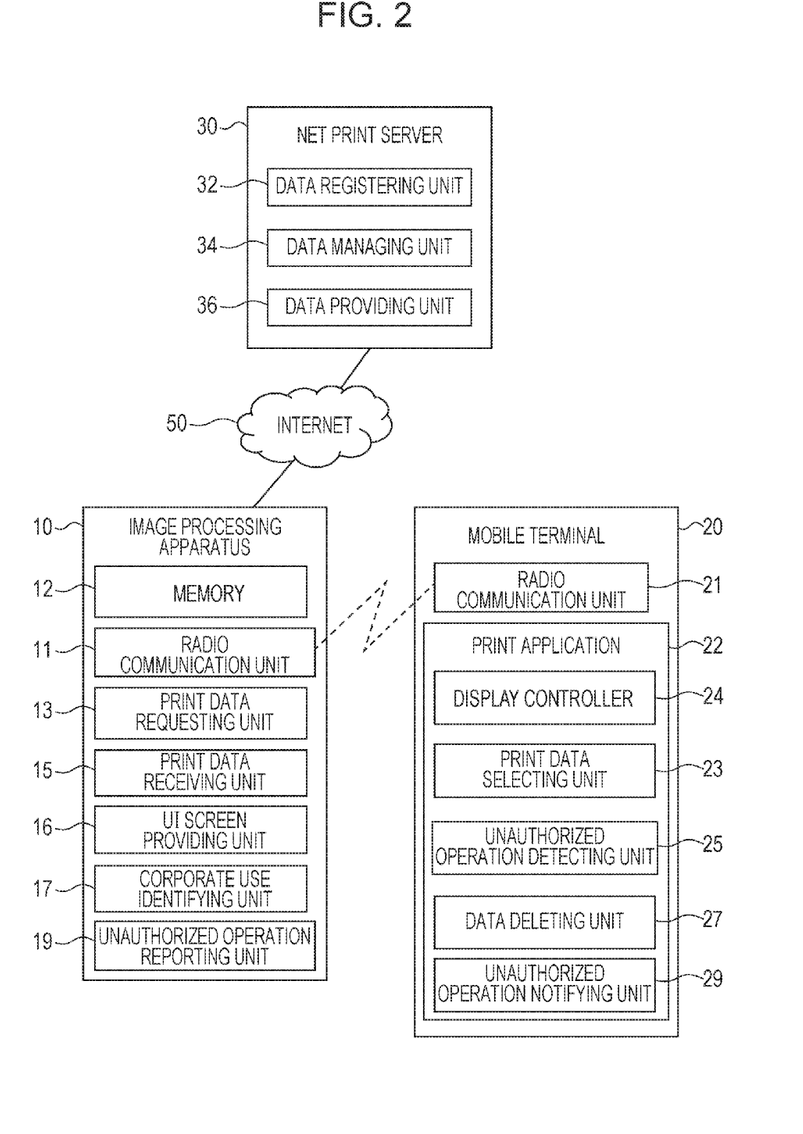
FIG. 2 is a diagram illustrating an example of functional configurations of individual apparatuses included in the system according to the exemplary embodiment.

The mobile terminal 20 includes a radio communication unit 21 and a print application 22.

The radio communication unit 21 is a system for performing radio communication using a near field radio scheme, such as Wi-Fi (registered trademark) or Bluetooth (registered trademark). In the exemplary embodiment, the near field radio communication function is used for communication with the image processing apparatus 10. The mobile terminal 20 may further include a system for data communication or voice communication to be performed via a mobile phone network.

The print application 22 is one of application programs installed in the computer of the mobile terminal 20, and provides a user interface (UI) function for using the image processing apparatus 10. The print application includes display controller 24. The print application 22 has the functions of a print data selecting unit 23, an unauthorized operation detecting unit 25, a data deleting unit 27, and an unauthorized operation notifying unit 29.

The print data selecting unit 23 is a function of a UI process for selecting an electronic document to be printed by the image processing apparatus 10. The print data selecting unit 23 displays a UI screen, such as a print document selection screen that is provided from the image processing apparatus 10 and shows a list of file names and thumbnail images of one or more electronic documents corresponding to a reservation number. Also, the print data selecting unit 23 may obtain a preview image of an electronic document (more detailed images than thumbnails of first several pages of the document) selected from the list by the user for preview display, and may display the preview image. Also, the print data selecting unit 23 receives, from the user, an operation of selecting one or more electronic documents to be printed this time from the list, and transmits a download request including the identification information about each selected document to the image processing apparatus 10.

The unauthorized operation detecting unit 25 detects an unauthorized operation, such as snapshot capturing, performed by a user while the print data selecting unit 23 displays the print document selection screen or a preview image on the UI screen. For example, in the case of snapshot capturing, the unauthorized operation detecting unit 25 is able to detect it by receiving a notification indicating that the snapshot capturing has been performed from the operating system of the mobile terminal 20 or by monitoring a certain folder in which snapshot images are stored and detecting an increase in the number of image files in the folder. The unauthorized operation detecting unit 25 also detects unauthorized operations other than snapshot capturing performed on the print application 22, in accordance with an installed detection method.

The data deleting unit 27 deletes, when a condition for triggering deletion of data is satisfied, the print document selection screen provided from the image processing apparatus 10, preview images, or data of a screenshot image of the screen displaying these images, from the volatile memory or nonvolatile memory of the mobile terminal 20.

The condition for triggering deletion of data may be that the unauthorized operation detecting unit 25 detects that an unauthorized operation such as snapshot capturing has been performed. Another condition is that a communication session between the mobile terminal 20 (especially the print application 22) and the image processing apparatus 10 has been disconnected. The disconnection of a session may be recognized by detecting disconnection of radio communication with the image processing apparatus 10 or detecting that an execution end operation of the print application 22 has been performed.

When the unauthorized operation detecting unit 25 detects an unauthorized operation such as snapshot capturing, the unauthorized operation notifying unit 29 transmits, to the image processing apparatus 10, a notification including a code indicating that the unauthorized operation has been performed and identification information corresponding to the UI screen that is on the display at the time, such as the print document selection screen. The notification is transmitted in a radio communication session between the radio communication unit 21 and the image processing apparatus 10. The identification information about the UI screen is provided together with information about the UI screen from the image processing apparatus 10.

The information about the UI screen provided from the image processing apparatus 10 to the mobile terminal 20 is accompanied with flag information indicating whether or not the information is a target of unauthorized operation detection (in this example, whether or not the information is related to corporate use). The unauthorized operation detecting unit 25 and the unauthorized operation notifying unit 29 operate if the flag information indicates that the information is a target of unauthorized operation detection. The same applies to the operation of unauthorized operation detection in the data deleting unit 27. Conversely, if the flag information indicates that the information is not a target of unauthorized operation detection, detection of an unauthorized operation is not performed, and notification and data deletion related to the detection are not performed.

The image processing apparatus 10 includes memory 12, a radio communication unit 11, a print data requesting unit 13, a print data receiving unit 15, a UI screen providing unit 16, a corporate use identifying unit 17, and an unauthorized operation reporting unit 19.

The radio communication unit 11 is a system for performing radio communication using a near field radio scheme, such as Wi-Fi (registered trademark) or Bluetooth (registered trademark), and is used for communication with the mobile terminal 20.

The print data requesting unit 13 transmits, to the Net print server 30, a print data request including a reservation number input by a user. Specifically, the print data requesting unit 13 obtains a reservation number that has been input by the user to a reservation number input field on the UI screen displayed on the operation panel of the image processing apparatus 10. Subsequently, the print data requesting unit 13 transmits a print data request including the reservation number to the Net print server 30 via the Internet 50. Alternatively, a screen including a reservation number input field may be provided to the mobile terminal 20, and input of a reservation number may be received via the mobile terminal 20.

The print data receiving unit 15 receives print data, which is transmitted from the Net print server 30 as a response to the print data request. The print data is an electronic document in the format that is able to be handled by the image processing apparatus 10, such as a document in a portable document format (PDF). In a case where plural electronic documents are registered in association with one reservation number, the print data receiving unit 15 receives the plural electronic documents. In the case of corporate use, an electronic document is registered in the Net print server 30 together with attached information such as a reservation number and an emergency contact address corresponding to the electronic document (see FIG. 3), and the print data receiving unit 15 also receives the attached information transmitted from the Net print server 30 together with the electronic document. The received information is stored in a management database (not illustrated) in the image processing apparatus 10. In the management database, a reservation number, one or more electronic documents that have been received, and information representing an emergency contact address are registered in association with one another.

The UI screen providing unit 16 provides the print data selecting unit 23 of the mobile terminal 20 with a UI screen that is to be used for providing a print instruction about the print data (electronic document) received by the print data receiving unit 15. The provided UI screen may be a screen that displays a list of file names or thumbnails of received print data (electronic documents) and receives selection of a target to be printed from the print data. When receiving an instruction to display a preview image of the print data selected from the list by the user from the mobile terminal 20, the UI screen providing unit 16 provides the print data selecting unit 23 of the mobile terminal 20 with a screen displaying a preview image of a representative page of the print data. The UI screen providing unit 16 provides the mobile terminal 20 with the UI screen together with identification information. The identification information may be, in an example, identification information uniquely assigned to the reservation number corresponding to the UI screen. In this example, the same identification information is associated with UI screens (a list screen, a preview screen, and so forth) in various stages provided by the UI screen providing unit 16 to the mobile terminal 20 for pieces of print data received in association with the reservation number. In another example, the identification information may be unique identification information about the UI screen. In this example, different identification numbers are assigned to various UI screens provided by the UI screen providing unit 16 for pieces of print data received in association with the reservation number. The provided identification information is registered in the above-described management database in association with the reservation number.

The corporate use identifying unit 17 identifies whether or not use of the image processing apparatus 10 by a user who has input a reservation number is corporate use. In an example, in the case of corporate use, print data received from the Net print server 30 is accompanied with special information indicating corporate use (for example, an emergency contact address, a flag indicating corporate use, or the like). In this case, the use is determined to be corporate use if the special information is attached to the print data received by the print data receiving unit 15 in accordance with the reservation number input by the user, whereas the use is determined not to be corporate use if the special information is not attached. In another example, buttons representing corporate use and personal use may be displayed on the operation panel so that the user is allowed to select one of them. In still another example, an ID card presented by a user may be read, an ID (identification information) obtained thereby may be transmitted to the Net print server 30, and whether or not the user is a corporate user may be determined by using a user information database (not illustrated, user IDs and information indicating whether or not the individual users are corporate users are registered) in the Net print server 30.

When the unauthorized operation reporting unit 19 receives a notification about an unauthorized operation from the unauthorized operation notifying unit 29 of the mobile terminal 20, the unauthorized operation reporting unit 19 specifies the reservation number corresponding to the UI screen as a target of the unauthorized operation, and transmits a report about the unauthorized operation to the emergency contact address corresponding to the reservation number. Specifically, since the unauthorized operation notification received from the unauthorized operation notifying unit 29 of the mobile terminal 20 includes identification information about the UI screen on which the unauthorized operation has been performed, the reservation number corresponding to the identification information is obtained from the above-described management database, and a report about the unauthorized operation is transmitted to the emergency contact address corresponding to the reservation number. The report may be transmitted by, for example, email or using a short message. The report about the unauthorized operation includes, for example, information representing the reservation number which is the target of the unauthorized operation. Further, the report may include a list of file names of electronic documents corresponding to the reservation number. In a case where identification information is assigned to each UI screen and the identification information is provided to the mobile terminal 20, the UI screen corresponding to the reservation number on which an unauthorized operation has been performed may be specified based on the identification information included in a notification about the unauthorized operation transmitted from the mobile terminal 20. The information about the print data (electronic document) included for the provided UI screen may be registered in the management database by the image processing apparatus 10. Thus, the electronic document on which an unauthorized operation has been performed may be specified by referring to the information. The information to be transmitted to an emergency contact address may include information (for example, a file name) representing the electronic document as the target of the unauthorized operation specified in this way.

The Net print server 30 includes a data registering unit 32, a data managing unit 34, and a data providing unit 36.

The data registering unit 32 receives registration of an electronic document to be printed from the PC 40 of the user. The data registering unit 32 provides the PC 40 with a UI screen for electronic document registration as a web page, for example, and receives upload of one or more electronic documents designated by the user on the UI screen. Subsequently, the data registering unit 32 issues a reservation number for the one or more electronic documents, notifies the user of the reservation number, and registers the one or more electronic documents in the data managing unit 34 in association with the reservation number. Also, a button for selecting corporate use or not is displayed on the UI screen. If the user selects corporate use on the screen, an input screen for inputting an emergency contact address that is to be used if an unauthorized operation is performed, such as an email address or phone number, is provided. The information representing the emergency contact address input on the input screen is registered in the data managing unit 34 in association with the reservation number. In another example, information representing an emergency contact address may be registered in the Net print server 30 for each corporation (or each department of a corporation). If access from the domain (or IP address) of the corporation is received, the Net print server 30 may determine that the use is corporate use, and may automatically register the registered emergency contact address in the data managing unit 34.

Figure 3:
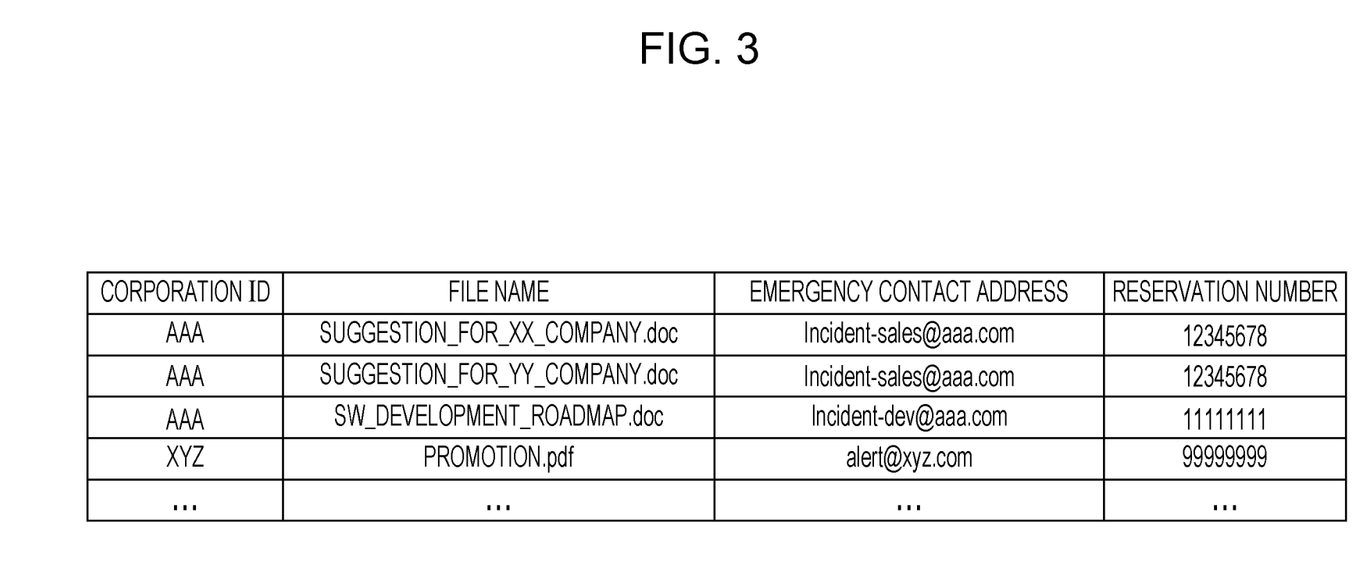
FIG. 3 is a diagram illustrating an example of management information regarding electronic documents registered by users, the information being managed by a Net print server.

The data managing unit 34 is a database that stores information, such as an electronic document registered by a user. An example of the data stored in the data managing unit 34 is illustrated in FIG. 3. In the database illustrated in FIG. 3, a corporation ID of a user who has registered an electronic document, a file name of the electronic document, an emergency contact address, and a reservation number are registered for each registered electronic document. In the example illustrated in FIG. 3, two electronic documents are registered in association with the reservation number "12345678". Regarding an electronic document that is registered by a user who is not a corporate user, a corporation ID and an emergency contact address are not registered.

The data providing unit 36 provides, via the Internet 50, the image processing apparatus 10 with an electronic document registered in the data managing unit 34 and its attached information in response to a request from a user operating the image processing apparatus 10. Specifically, the data providing unit 36 receives a reservation number input by the user from the image processing apparatus 10, and transmits each electronic document stored in the data managing unit 34 in association with the reservation number and its attached information such as an emergency contact address to the image processing apparatus 10.

Figure 4:
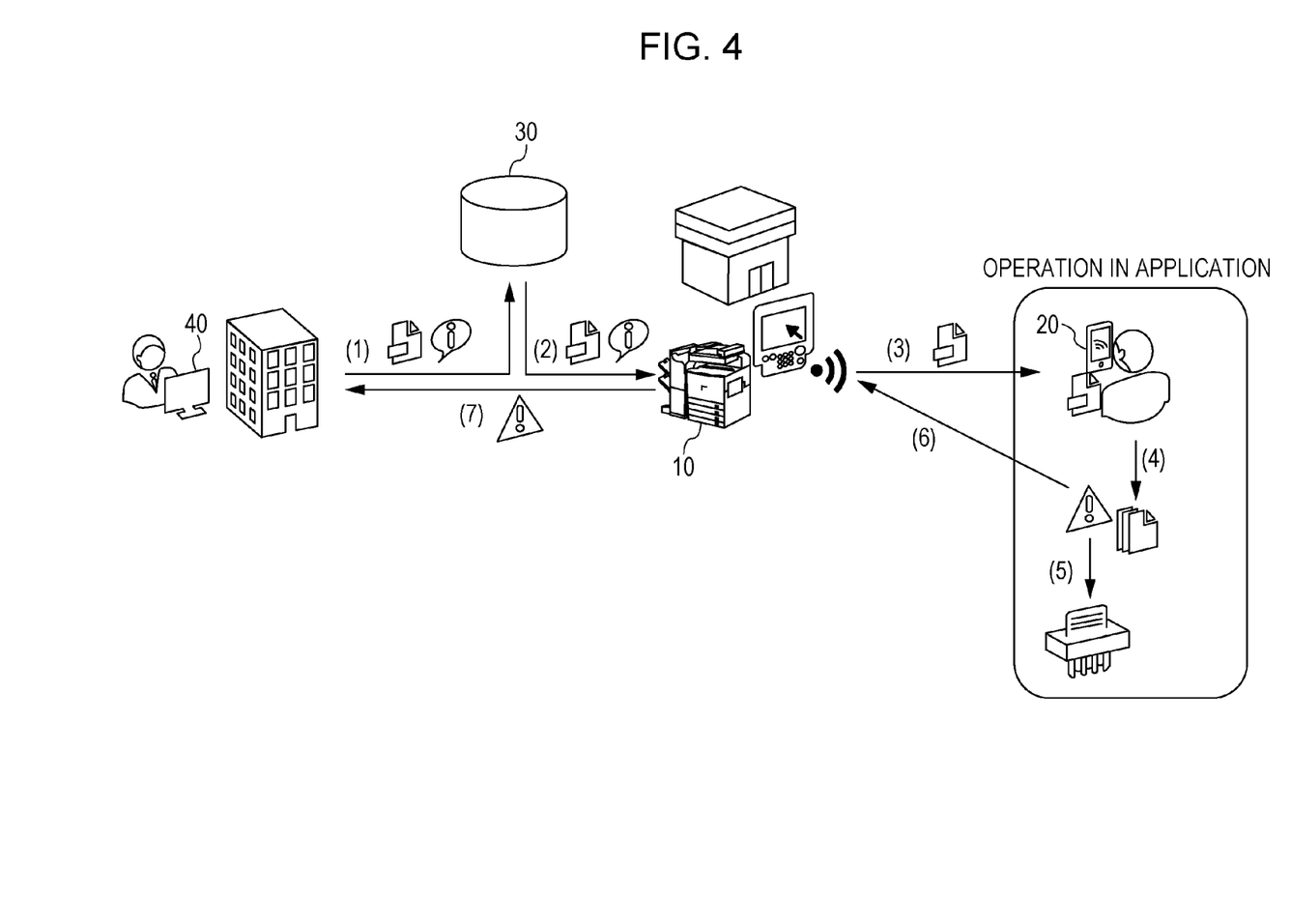
FIG. 4 is a diagram illustrating an example of a flow of a process performed in the system according to the exemplary embodiment.

Next, a flow of a process performed in the system according to the exemplary embodiment will be described with reference to FIG. 4.

(1) First, a user registers an electronic document and an emergency contact address in the Net print server 30 from the PC 40 in the company. In accordance with the registration, the user obtains a reservation number from the Net print server 30. The user may notify another person of the obtained reservation number by email or the like. The person who has obtained the reservation number (the user who has registered the document and the person who has been notified of the reservation number from the user) is able to print the electronic document by using the image processing apparatus 10 compatible with the Net print server 30 and the reservation number.

(2) Subsequently, the user goes to the image processing apparatus 10 and inputs the reservation number. Accordingly, the electronic document registered in association with the reservation number and information representing the corresponding emergency contact address are transmitted from the Net print server 30 to the image processing apparatus 10. The user may be the person who has registered the electronic document in the Net print server 30 or may be another person (for example, the person who has received the reservation number from the person who has registered the document).

(3) If the user instructs the image processing apparatus 10 to transfer a UI screen to the mobile terminal 20 carried by the user, the image processing apparatus 10 provides the mobile terminal 20 with the UI screen for performing a printing process for the reservation number by radio communication. The UI screen provided here may be, for example, a screen displaying a list of file names or thumbnails of electronic documents, or a preview screen for individual electronic documents. At this time, the image processing apparatus 10 does not display the UI screen for performing a printing process on the operation panel of the image processing apparatus 10 (instead, a menu screen or advertisement may be displayed on the operation panel). If the user does not provide an instruction to transfer the UI screen to the mobile terminal 20, the UI screen for a printing process is displayed on the operation panel as in the related art.

(4) It is assumed that screenshot capturing is performed while the UI screen is displayed on the mobile terminal 20. The unauthorized operation detecting unit 25 in the print application 22 detects that the screenshot capturing has been performed.

(5) In accordance with the detection by the unauthorized operation detecting unit 25, the data deleting unit 27 deletes, from various storage devices of the mobile terminal 20, data of the UI screen obtained from the image processing apparatus 10 to the mobile terminal 20 in the above-described step (3) and a screenshot image. If information about the electronic document is provided in addition to the UI screen from the image processing apparatus 10 to the mobile terminal 20 in the above-described step (3), the information is also deleted.

(6) Also, in accordance with the detection by the unauthorized operation detecting unit 25, the unauthorized operation notifying unit 29 transmits a notification indicating that the unauthorized operation has been performed to the image processing apparatus 10 by radio communication. If the unauthorized operation performed by the user is screenshot capturing, the captured screenshot image may be included in the notification about the unauthorized operation. In this case, the screenshot image is deleted by the data deleting unit 27 after the notification has been received.

(7) The image processing apparatus 10 that has received the notification about the unauthorized operation from the unauthorized operation notifying unit 29 of the mobile terminal 20 reports, to the emergency contact address stored in the data managing unit 34 in association with the reservation number, the fact that the unauthorized operation has been performed in the mobile terminal 20 while the printing process on the electronic document is performed. If the image processing apparatus 10 receives a screenshot image together with the notification about the unauthorized operation from the mobile terminal 20, the image processing apparatus 10 encrypts the screenshot image and transmits the encrypted screenshot image and the notification about the unauthorized operation to the emergency contact address. At this time, the image processing apparatus 10 may display an error screen on the operation panel so that the user is unable to continue the printing process via the operation panel.

The above-described information processing mechanisms of the image processing apparatus 10 and the mobile terminal 20, and the Net print server 30 may be implemented by causing a computer included in the image processing apparatus 10 to execute programs representing the functions of the individual apparatuses. Here, the computer has a hardware circuit configuration in which a microprocessor such as a central processing unit (CPU), memories (primary storage) such as a random access memory (RAM) and a read only memory (ROM), a hard disk drive (HDD) controller that controls an HDD, various input/output (I/O) interfaces, and a network interface that performs control to establish a connection with a network such as a local area network (LAN) are connected to one another via a bus. The bus may be connected, via an I/O interface, to a disc drive for reading data from and/or writing data on a portable disc recording medium such as a compact disc (CD) or a digital versatile disc (DVD), and a memory reader/writer for reading data from and/or writing data on a portable nonvolatile recording medium of various standards such as a flash memory. A program describing the processes of the above-described individual functional modules is stored in a fixed storage device such as a hard disk drive via a recording medium such as a CD or DVD or via a communication medium such as a network, and is installed in a computer. When the program stored in the fixed storage device is read into the RAM and is executed by the microprocessor such as a CPU, the above-described functional modules are implemented.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
a mobile terminal; and
an image processing apparatus,
the mobile terminal including
a display controller that obtains display data related to an electronic document from the image processing apparatus and performs control to display the obtained display data on a screen, and
a notification transmitting unit that, if an unauthorized operation is performed when the display data is displayed on the screen under the control performed by the display controller, transmits an unauthorized operation notification indicating that the unauthorized operation has been performed on the display data to the image processing apparatus, and
the image processing apparatus including
a device for printing a document onto a substrate,
a memory that stores an electronic document for printing by the image processing apparatus and a contact address in association with each other,
a providing unit that provides the mobile terminal with display data related to the electronic document, and
a reporting unit that, in response to receipt of the unauthorized operation notification regarding the display data from the mobile terminal, transmits a report indicating that the unauthorized operation has been performed to the contact address associated with the electronic document related to the display data directly without use of a net print server,
the image processing system further including the net print server, the net print server being separate from the image processing apparatus, the electronic document and associated contact address being downloaded from the net print server to the image processing apparatus.

2. The image processing system according to claim 1, wherein the mobile terminal further includes a deleting unit that, if an unauthorized operation is performed when the display data is displayed on the screen under the control performed by the display controller, deletes the display data obtained by the display controller.

3. The image processing system according to claim 2, wherein
if the unauthorized operation that has been performed is screenshot capturing, the notification transmitting unit transmits, to the image processing apparatus, the unauthorized operation notification and image data that has been obtained through the screenshot capturing, and
the reporting unit transmits, to the contact address, the report and the image data that has been received together with the unauthorized operation notification.

4. The image processing system according to claim 1, wherein
if the unauthorized operation that has been performed is screenshot capturing, the notification transmitting unit transmits, to the image processing apparatus, the unauthorized operation notification and image data that has been obtained through the screenshot capturing, and
the reporting unit transmits, to the contact address, the report and the image data that has been received together with the unauthorized operation notification.

5. An image processing apparatus comprising:
a device for printing a document onto a substrate;
a memory that stores an electronic document for printing by the image processing apparatus and a contact address in association with each other, wherein the electronic document and associated contact address are downloaded from a net print server;
a providing unit that provides a mobile terminal with display data related to the electronic document; and
a reporting unit that, in response to receipt of an unauthorized operation notification regarding the display data from the mobile terminal, transmits a report indicating that an unauthorized operation has been performed to the contact address associated with the electronic document related to the display data directly without use of the net print server.

6. An image processing system comprising:
a mobile terminal; and
an image processing apparatus,
the mobile terminal including
a display controller that obtains display data related to an electronic document from the image processing apparatus and performs control to display the obtained display data on a screen, and
a notification transmitting unit that, if an unauthorized operation is performed when the display data is displayed on the screen under the control performed by the display controller, transmits an unauthorized operation notification indicating that the unauthorized operation has been performed on the display data to the image processing apparatus, and
the image processing apparatus including
a device for printing a document onto a substrate,
a memory that stores an electronic document for printing by the image processing apparatus and a contact address in association with each other,
a providing unit that provides the mobile terminal with display data related to the electronic document, and
a reporting unit that, in response to receipt of the unauthorized operation notification regarding the display data from the mobile terminal, transmits a report indicating that the unauthorized operation has been performed to the contact address associated with the electronic document related to the display data,
the image processing system further including a net print server separate from the image processing apparatus, the electronic document and associated contact address being downloaded from the net print server to the image processing apparatus, wherein the image processing apparatus further includes an operation panel, and wherein in response to receipt of the unauthorized operation notification regarding the display data from the mobile terminal, the image processing apparatus displays an error screen on the operation panel so that printing of the electronic document cannot be continued via the operation panel.

* * * * *